United States Patent Office 3,309,372
Patented Mar. 14, 1967

3,309,372
PYRIDINECARBOXYLIC ACID DERIVATIVES OF 3-AZABICYCLO-[3.2.2] NONANE
Carl Peter Krimmel, Wauconda, Ill., assignor to G. D. Searle & Co., Chicago, Ill., a corporation of Delaware
No Drawing. Filed May 5, 1964, Ser. No. 365,165
5 Claims. (Cl. 260—295)

The present invention relates to a group of compounds which are acid derivatives of 3-azabicyclo[3.2.2]nonane wherein the acid portion contains a pyridine nucleus. More particularly, the present invention relates to compounds having the following general formula

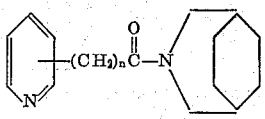

wherein $n$ is a whole number between 0 and 3 inclusive. Thus, the acid portion is based on pyridinecarboxylic acids, pyridineacetic acids, pyridinepropionic acids, and pyridinebutyric acids.

The compounds of this invention possess useful pharmacological properties. In particular, they possess activity as pepsin inhibitors and anti-ulcer agents. In addition, they demonstrate anti-biotic activity against a variety of organisms. Thus, they inhibit the growth of the bacteria *Diplococcus pneumoniae*, the protoza *Tetrahymena gelleii*, and the fungus *Trichophyton mentagrophytes*, and they inhibit germination of seeds of *Trifolium*.

The organic bases of the present invention form non-toxic salts with a variety of inorganic and strong organic acids including sulfuric, phosphoric, hydrochloric, hydrobromic, sulfamic, citric, lactic, maleic, malic, succinic, tartaric, cinnamic, acetic, benzoic, gluconic, and related acids. They also form quaternary ammonium salts with a variety of organic esters of sulfuric, hydrohalic, and aromatic sulfonic acids. Among such esters are methyl chloride, methyl iodide, ethyl chloride, propyl bromide, butyl chloride, isobutyl bromide, ethyl chloroacetate, β-bromoethyl acetate, methyl β-bromopropionate, ethylene bromohydrin, ethylene chlorohydrin, propylene bromohydrin, benzyl chloride, benzyl bromide, phenethyl bromide, napthylmethyl chloride, dimethyl sulfate, diethyl sulfate, methyl benzenesulfonate, ethyl toluenesulfonate, propyl toluenesulfonate, propyl chlorohydrin, γ-hydroxypropyl bromide, allyl chloride, methallyl chloride, crotyl bromide and the like.

The compounds of the present invention are prepared by the reaction of 3-azabicyclo[3.2.2]nonane with the appropriate carboxylic acid derivative which contains the pyridine nucleus. Thus, an acid halide, preferably the chloride, or a lower alkyl ester, preferably the methyl or ethyl, can be used in the reaction. In both cases, heat is used to promote the reaction.

The following examples are presented to further illustrate the present invention; they should not be construed as limiting it in spirit or in scope. In these examples, quantities are indicated in grams, volumes in milliliters, and temperatures in degrees centigrade (° C.).

EXAMPLE 1

To a suspension of 26.7 g. of nicotinoyl chloride hydrochloride in 150 ml. of anhydrous pyridine there is added, slowly with stirring, a solution of 18.8 g. of 3-azabicyclo-[3.2.2]nonane in 60 ml. of anhydrous pyridine. The resultant mixture is refluxed for 30 minutes and stripped of pyridine by vacuum distillation on a steam bath. The residue is dissolved in 150 ml. of water and sodium hydroxide is added until a yellow oily layer separates. The resultant mixture is extracted with ether and the ether extract is treated with activated carbon and then dried over anhydrous potassium carbonate. The ether is stripped from the dried extract and the resultant residue is distilled under reduced pressure to give a viscous yellow oil boiling at about 207–210° C. at 3.0 mm. This material is 3-nicotinoyl-3-azabicyclo[3.2.2]nonane and it has the following formula

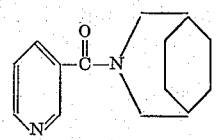

EXAMPLE 2

To a solution of 6.2 parts of 3-nicotinoyl-3-azabicyclo-[3.2.2]nonane in 50 ml. of 2-butanone is added one equivalent of hydrogen chloride as a solution consisting of 0.23 g. of hydrogen chloride per ml. of anhydrous 2-propanol. Crystallization is induced by stirring and scratching. The thick white crystalline slurry which forms is separated by filtration, washed with 2-butanone, and dried in a steam cabinet. The product thus obtained is 3-nicotinoyl-3-azabicyclo[3.2.2]nonane hydrochloride melting at about 174–176° C.

EXAMPLE 3

A mixture of 3.5 g. of 3-nicotinoyl-3-azabicyclo[3.2.2] nonane and 14.2 g. of methyl iodide in 10 ml. of 2-butanone is allowed to stand at room temperature for about 15 minutes. The mixture is then stirred briefly to accelerate crystallization of the product. It is then allowed to stand for 4 hours before it is filtered. The filtered precipitate is washed with 5 ml. of cold 2-butanone and dried in air to give bright yellow crystals of 3-nicotinoyl-3-azabicyclo[3.2.2]nonane methiodide melting at about 201–204° C.

EXAMPLE 4

A mixture of 60 g. of isonicotinic acid and 200 ml. of thionyl chloride is refluxed on a steam bath for 5 hours. Excess thionyl chloride is then removed by distilling the mixture on a steam bath at reduced pressure. The resultant residue is mixed with dry benzene which is then distilled from the mixture under reduced pressure to remove the last traces of thionyl chloride. The resultant residue of isonicotinoyl chloride hydrochloride is then suspended in 100 ml. of anhydrous pyridine. To this suspension there is added, slowly and with stirring, a solution of 61.3 g. of 3-azabicyclo[3.2.2]nonane in 150 ml. of anhydrous pyridine. The resultant mixture is refluxed for 30 minutes and then stripped of pyridine by vacuum distillation on a steam bath. The crystalline slurry which results is dissolved in 400 ml. of water and sodium hydroxide is added until a dark brown oily layer separates. The resultant mixture is then extracted with ether and the ether extract dried over anhydrous potassium carbonate, decolorized with activated carbon, and filtered. The filtrate is concentrated to a crystalline slurry which is recrystallized from 600 ml. of refluxing cyclohexane. The product thus obtained is 3-isonicotinoyl-3-azabicyclo-[3.2.2]nonane and it melts at about 86–88° C. This compound has the following formula

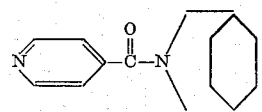

EXAMPLE 5

To a solution of 1.9 g. of 3-isonicotinoyl-3-azabicyclo-[3.2.2]nonane in 150 ml. of anhydrous ethyl ether is added 2 equivalents of hydrogen chloride as a solution consisting of 0.23 g. of hydrogen chloride per ml. of anhydrous 2-propanol. The solid which first forms is tacky but changes to a brittle solid on standing. It is separated by filtration, dried, and recrystallized from 400 ml. of refluxing acetone. The acetone solution is concentrated to half the original volume and then cooled to give white crystals of 3-isonicotinoyl-3-azabicyclo[3.2.2]nonane hydrochloride melting gradually from 210–230° C.

EXAMPLE 6

To a warm stirred solution of 6.9 g. of 3-isonicotinoyl-3-azabicyclo[3.2.2]nonane in 40 ml. of 2-butanone there is 28.4 g. of methyl iodide. The reaction mixture first turns deep orange and the flaky yellow crystals form. The reaction mixture is then refluxed for 15 minutes before it is cooled. A yellow crystalline precipitate forms. This is separated and dried in a steam cabinet. The product thus obtained is 3-isonicotinoyl-3-azabicyclo[3.2.2]nonane methiodide melting at about 243–251° C.

EXAMPLE 7

A mixture of 8.3 g. of ethyl 3-pyridylacetate, 6.3 g. of 3-azabicyclo[3.2.2]nonane, and 30 ml. of p-cymene is refluxed for 11 hours. The resultant amber colored solution is cooled, filtered to remove traces of solid, and concentrated to a dark brown syrup. This material is treated with 50 ml. of n-heptane to give a granular solid. The solid is filtered, dried in air, and recrystallized from refluxing cyclohexane to give needle-like crystals of 3-(3-pyridylacetyl) - 3 - azabicyclo[3.2.2]nonane melting at about 103–106° C. This compound has the following formula

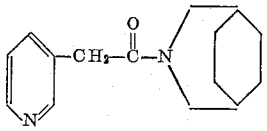

EXAMPLE 8

If an equivalent quantity of methyl γ-(4-pyridyl)butyrate is substituted for the ethyl 3-pyridylacetate and the procedure of Example 7 is repeated, there is obtained 3-[γ-(4-pyridyl)butyl]-3-azabicyclo[3.2.2]nonane. This compound has the following formula

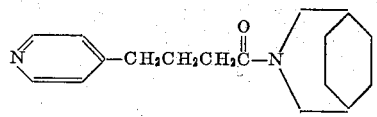

What is claimed is:
1. A compound of the formula

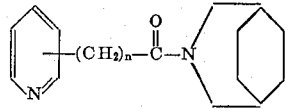

wherein $n$ is a whole number between 0 and 3 inclusive.

2. A compound of the formula

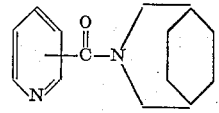

3. 3-(nicotinoyl-3-azabicyclo[3.2.2]nonane.
4. 3-isonicotinoyl-3-azabicyclo[3.2.2]nonane.
5. 3-(3-pyridylacetyl)-3-azabicyclo[3.2.2]nonane.

References Cited by the Examiner

Index Chemicus., vol. 17, Abstract 51461 (1965).
Industrial and Eng. Chem., Product Res. and Development, vol. 4, p. 40, March 1965.

WALTER A. MODANCE, *Primary Examiner.*
ALAN L. ROTMAN, *Assistant Examiner.*